United States Patent [19]

Horowitz et al.

[11] 3,810,236

[45] May 7, 1974

[54] DATA RECORDING AND VERIFICATION SYSTEM

[75] Inventors: Noah Horowitz; Donald Stupeck, both of Los Angeles; Lubomir Novak, Woodland Hills, all of Calif.

[73] Assignee: Sperry Rand Corporation, New York, N.Y.

[22] Filed: Sept. 21, 1972

[21] Appl. No.: 290,833

Related U.S. Application Data

[63] Continuation of Ser. No. 133,036, April 12, 1972, abandoned.

[52] U.S. Cl. .......................................... 360/53

[51] Int. Cl. .......................................... G11b 5/46

[56] References Cited

UNITED STATES PATENTS

| | | | |
|---|---|---|---|
| 3,359,548 | 12/1967 | Yoshii et al. | 340/174.1 B |
| 3,438,018 | 4/1969 | Braun | 340/174.1 G |
| 3,228,016 | 1/1966 | Hopner | 340/174.1 G |
| 3,505,662 | 4/1970 | Hipner | 340/174.1 G |
| 2,969,528 | 1/1961 | Chen | 340/174.1 G |
| 2,922,144 | 1/1960 | White et al. | 340/174.1 G |
| 2,891,236 | 6/1959 | Eisenberg | 340/174.1 G |
| 3,512,171 | 5/1970 | Hibner | 340/174.1 G |
| 3,510,857 | 6/1967 | Kennedy et al. | 340/174.1 B |
| 3,344,417 | 9/1967 | Boyle | 340/174.1 B |
| 3,368,211 | 2/1968 | Taris | 340/174.1 B |

*Primary Examiner*—Vincent P. Canney
*Attorney, Agent, or Firm*—Charles C. English

[57] ABSTRACT

A digital data recording and verification system for use in moving magnetic medium recording systems such as tape or disc. The recording and verification system includes a magnetic head having a first winding used for writing (which may also be used for reading) information onto the medium and a second winding coupled thereto which may be used for erasing previously recorded information. As current, in response to input data, is driven through the first winding to produce flux changes in the head core, a voltage is induced in the second winding. This induced voltage is compared with the input data to verify, on a bit-by-bit basis, that the recorded data matches the input data.

7 Claims, 7 Drawing Figures

INVENTORS
NOAH HOROWITZ
DONALD G. STUPECK
BY LUBOMIR NOVAK
Lindenberg, Freilich & Wasserman
ATTORNEYS

*INVENTORS*
NOAH HOROWITZ
DONALD G. STUPECK
*BY* LUBOMIR NOVAK

ATTORNEYS

DATA RECORDING AND VERIFICATION SYSTEM

This is a continuation, of application Ser. No. 133,036, filed Apr. 12, 1972 now abandoned.

BACKGROUND OF THE INVENTION

1. Field of the Invention:

This invention relates generally to digital data storage systems and, more particularly, to a data recording and verification system for use in moving magnetic medium recording systems such as tape or disc.

2. Description of the Prior Art:

Despite the fact that state of the art digital write circuitry usually enables information to be recorded onto a magnetic medium with great accuracy, high performance recording systems often include a verification system for verifying that the information actually recorded precisely corresponds to the input data intended to be recorded. Various verification techniques suitable for such applications are known in the art.

SUMMARY OF THE INVENTION

The present invention is directed to an improved data recording and verification system for comparing data actually being recorded, on a bit-by-bit basis, with input data intended to be recorded.

In the preferred embodiment of the invention, data usually being written onto a magnetic recording surface, as a consequence of flux changes in a magnetic head core produced by a write winding, is monitored by a second winding also coupled to the core. An erase winding often available as part of a magnetic recording head can be conveniently used for this monitoring function. Flux changes produced in the core during writing induce a voltage in the erase winding which are representative of the information actually being written onto the magnetic medium. This induced voltage, together with a signal representative of the input data controlling the write winding, is coupled to a comparator circuit. The comparator circuit functions to provide an error output signal in the event the written data represented by the induced voltage fails to match the input data intended to be recorded.

The novel features of the invention are set forth with particularity in the appended claims. The invention will be best understood from the following description when read in conjunction with the accompanying drawing.

DESCRIPTION OF THE PREFERRED EMBODIMENTS

Figure 1:
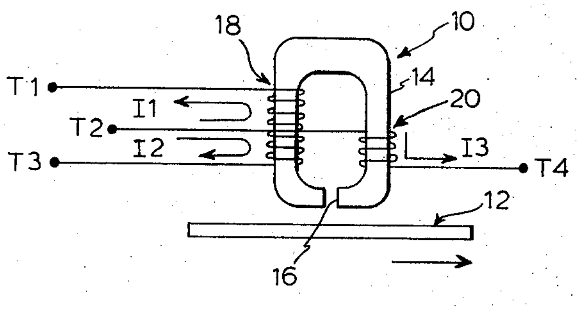
FIG. 1 is a schematic diagram of a magnetic head for use with a moving magnetic recording medium.

Attention is now called to FIG. 1 which schematically illustrates a typical magnetic head 10 for use in conjunction with a moving magnetic recording medium 12 which may, for example, constitute a disc or tape.

The magnetic head 10 is comprised of a core 14 formed of ferro-magnetic material which defines a gap

16 in close proximity to the path of the magnetic medium 12. First and second windings 18 and 20 are wound on the core and are magnetically coupled to on another through the core material. As illustrated, the winding 18 is provided with two terminals T1 and T3 and a center tap T2. The winding 20 is connected between the center tap T2 and a terminal T4.

In the use of the magnetic head of FIG. 1, during writing, current is driven through the winding 18 from the center tap T2 to either terminal T1 or T3 depending upon the information being recorded. By driving a current I1 through the winding 18 from the center tap T2 to terminal T1, magnetic flux will be produced across the gap 16 in a first direction to similarly orient the magnetic material on medium 12. By driving a current I2 through the winding 18 from center tap T2 to terminal T3, magnetic flux will be produced across the gap 16 in an opposite second direction to correspondingly orient the magnetic material on medium 12.

In order to read information recorded on the magnetic medium 12, the voltage induced in the winding 18 between terminals T1 and T3 is sensed.

In the use of the magnetic head 10 of FIG. 1 for writing information, an information source is coupled to the winding 18 so as to produce flux reversals across the gap 16 representative of the information to be recorded. In high performance recording systems such as are utilized in modern digital data processing systems, it is extremely important that each bit of information intended to be recorded, is actually recorded. As a consequence of this requirement, many state of the art recording systems incorporate verification subsystems which function to compare the recorded information with the information intended to be recorded. In any such verification system, it is of course desirable to verify the recorded information as close to the recording medium as possible. That is, it is desirable to minimize the number of circuit elements in the chain between the recording surface 12 and the verification or comparison means in order to minimize the likelihood of any errors being introduced.

Figure 2:
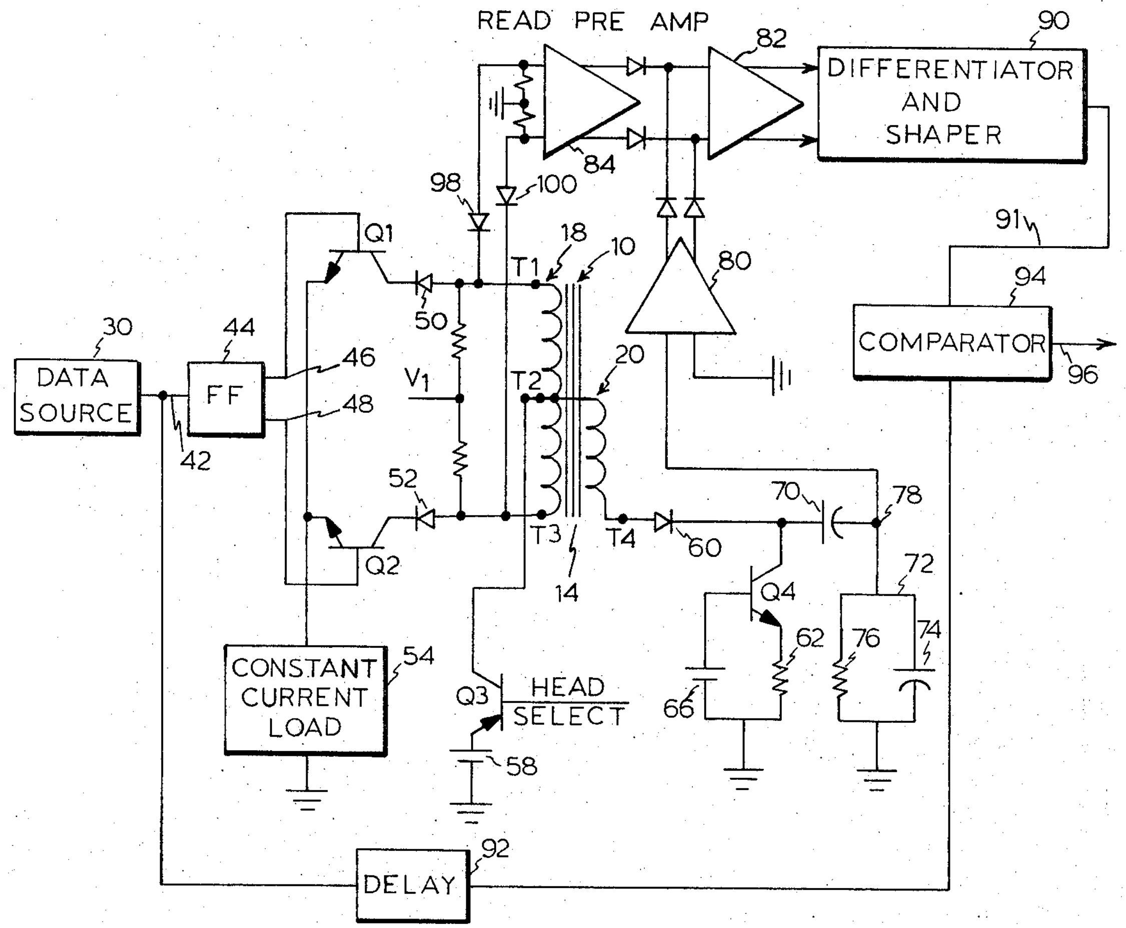
FIG. 2 is a schematic diagram of a data recording and verification system in accordance with the present invention.

In the preferred embodiment of the invention illustrated in FIG. 2, the data actually being recorded is sensed by a winding 20, which can comprise an available bias or erase winding, magnetically coupled to the write winding 18. A voltage induced in the winding 20 during writing is compared with the input data intended to be recorded to verify the accuracy of the information being recorded.

Prior to considering the details of FIG. 2, it is pointed out that the digital information provided by the source 30 can, in any particular system, be represented in any one of several different formats. For example only, it will be assumed herein that information could to be recorded on the magnetic medium 12 in accordance with a Manchester format. As is well known in the art, the Manchester format is characterized by a flux reversal at the center of every bit interval. "1" bits are characterized by a flux reversal at the center point of each bit in one direction while "O" bits will have a center point flux reversal in an opposite direction. As is represented in line (a) of FIG. 3, the data source 30 may merely provide a series of successive pulses 40, each intended to represent a flux reversal or signal level transition.

In order to write the represented digital information onto the recording surface, the output of the data source 30 is coupled to a switching input terminal 42 of a flip-flop 44. The flip-flop 44 is provided with first and second output terminals 46 and 48. As is represented in line (b) of FIG. 3, in response to each pulse 40 applied to the flip-flop 44, the flip-flop will switch states. Line (b) of FIG. 3, for example, illustrates the waveform of flip-flop output terminal 46. The waveform on output terminal 48 will, of course, be the complement of the waveform illustrated in line (b). From what has been said thus far with respect to the format, it will be appreciated that the exemplary bit sequence represented in line (b) of FIG. 3 is 1,0,0,1.

The flip-flop output terminals 46 and 48 are respectively connected to the base electrodes of first and second switch transistors Q1 and Q2. The collectors of transistors Q1 and Q2 are connected through diodes 50 and 52 respectively to the terminals T1 and T3 of a head write winding 18. The emitters of transistors Q1 and Q2 are connected in common to a constant current load 54. A positive potential is applied to the center tap T2 by source 58. Application of the positive potential to center tap T2 may be through a head select transistor switch Q3 which, in a multi-head system, allows for the selective enabling of heads. During a write operation, either switch transistor Q1 or switch transistor Q2 will be enabled to thus drive either current I1 or current I2 through the winding 18.

In addition to the winding 18, a winding 20 is typically provided on the head 10 for the purpose of erasing the magnetic medium. More particularly, a direct current is normally continually driven through the winding 20 when the illustrated head select switch Q3 is enabled. That is, a direct current path is established from the voltage source 58 through the enabled head select transistor Q3, through the center tap T2, through the winding 20, through the diode 60, and then through a DC current source comprised of transistor Q4 and resistor 62. The transistor Q4 is forward biased by a potential source 66. The direct current continually applied through the winding 20 functions to establish a uniform magnetic orientation along the recording medium 12 so as to thereby erase any previously recorded information.

Figures 3A, 3B, 3C, 3D, 3E:
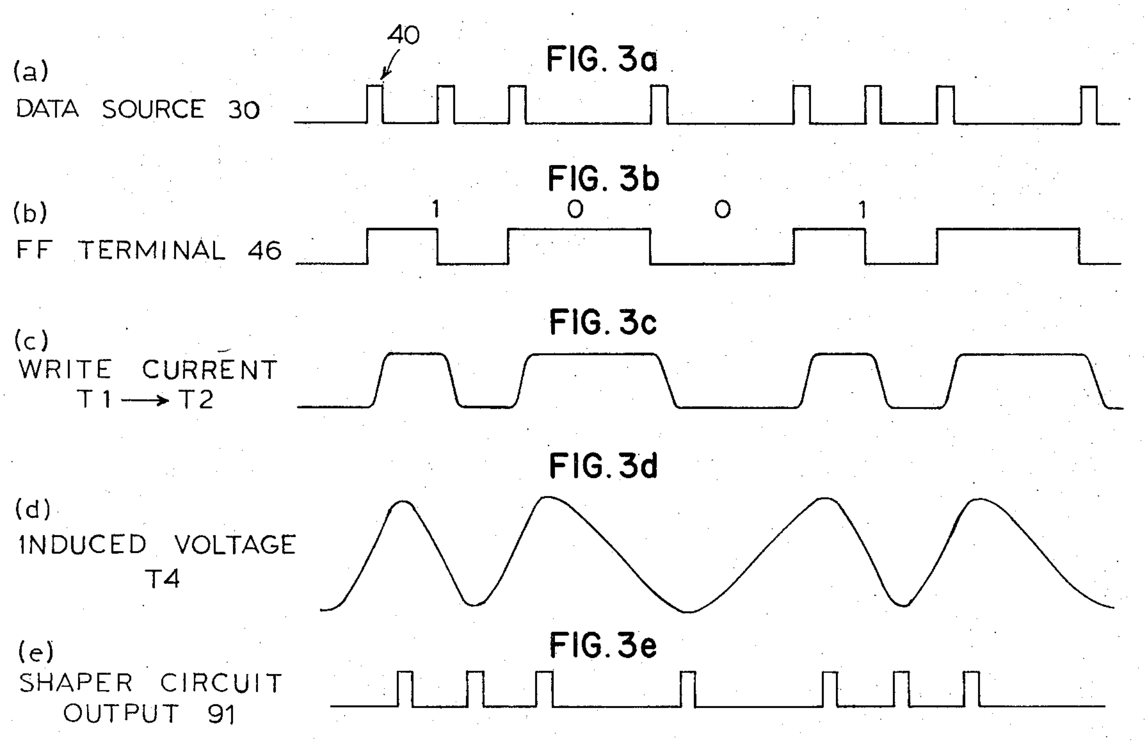
FIG. 3 consisting of FIGS. 3*a* through 3*e* is a waveform diagram illustrating various waveforms occurring at different locations in the circuit of FIG. 2.

Line (c) of FIG. 3 illustrates the write current driven through the winding 18 from the center tap T2 to terminal T1 in response to the switching of the flip-flop illustrated in line (b). This write current, of course, produces the flux changes within the core 14 which directly magnetically records information on the medium 12. In accordance with the present invention, the information being recorded is monitored by monitoring the flux changes. That is, the flux changes produced in the head core induce a voltage in the erase winding 20 which is illustrated in line (d) of FIG. 3. The variations in this induced voltage or induced voltage pulses are AC coupled to an amplifier circuit 80 via a coupling network 72 composed of capacitors 70 and 74 and resistors 62 and 76. Capacitor 70 is the AC coupling element. Capacitor 74 functions as a filter element. Resistors 62 and 76 effect signal attenuation as required for compatibility with the dynamic range of amplifier 80. Furthermore, resistor 62 controls the domping of the erase winding 20. That is, the DC erase current through the winding 20 will establish a certain potential at the collector of transistor Q4. The AC voltage shown in line (d) of FIG. 3 induced in the erase winding 20 will produce a corresponding voltage swing at circuit junction 78. This voltage swing is applied to an amplifier circuit 80 which in turn provides the signal to a normally available read amplifier 82. That is, the read amplifier 82 is normally available as part of the read circuitry to accept an output signal from a read preamplifier 84 which in turn is responsive to a voltage produced between terminals T1 and T3 during a read operation.

The derived or output voltage developed by amplifier 82 during writing corresponds to the waveform illustrated in line (d) of FIG. 3. This voltage is applied to a differentiator and shaper circuit 90 to produce at its output terminal 91, the derived voltage pulse train illustrated in line (e) of FIG. 3.

In accordance with the invention, the derived voltage pulse train of line (e) of FIG. 3 representing the recorded information is compared with the input data pulse train supplied by the source 30. More particularly, the data source pulses at terminal 42 is connected through a suitably adjusted time delay circuit 92 to provide delayed data pulses at one input of a comparator circuit 94. The output 91 of the differentiator and wave shaper circuit 90 is connected to a second input of the comparator circuit 94. The comparator circuit 94 which is comprised of conventional digital circuitry, functions to provide an error output signal on its output terminal 96 in the event the sequence of signals applied to both its inputs fail to match.

In summary, in the operation of the circuit of FIG. 2, as bit information is successively supplied by the data source 30 to the flip-flop 44, appropriately directed currents will be driven through the winding 18 to produce flux changes in the core 14 for recording information on the medium 12. The flux changes in the core 14, in addition to recording information on the medium 12, induce a voltage in the winding 20. This induced voltage is coupled by the coupling network 72, amplified, and then differentiated and shaped to develop the pulse train of line (e) of FIG. 3. This pulse train, which is of course representative of the flux reversals occurring in the core 14 is then compared with the pulse train provided by the data source 30 to verify, on a bit-by-bit basis, the identity therebetween.

From the foregoing, it will be recognized that a data recording and verification system has been disclosed herein in which the flux changes actually produced in the core for recording information, are monitored to verify recording accuracy. Although in the preferred embodiment of the invention illustrated, monitoring of the core flux changes is effected by utilization of the erase winding 20, it is recognized that other techniques could be employed for monitoring and accordingly it is intended that the claims be interpreted to cover such modifications and equivalents.

We claim:

1. A system for simultaneously recording and verifying data comprising:

a source of data pulses indicative of information to be recorded on a magnetic medium having at least one pulse for each bit of data to be recorded, a magnetic head having a flux path linking said magnetic medium, a write winding on said head coupled to said source of data pulses for creating writing flux changes in said magnetic head indicative of a data bit being written on said magnetic medium, detecting means for sensing said writing flux changes in said magnetic head at the same time said data is being written on said magnetic medium and providing induced voltage pulses simultaneously with said writing flux changes being detected, means for amplifying and shaping said induced voltage pulses and providing derived voltage pulses subsequent to said induced voltage pulses, delay means coupled to said source of data pulses for providing delayed data pulses, and comparison means adapted to receive said delayed data pulses and said derived voltage pulses for producing error signals when said writing flux changes in said magnetic head do not coincide in time and polarity with said induced voltage pulses whereby writing flux changes and verifying operations occur simultaneously, thereby eliminating the requirement for buffer and storage registers.

2. The system as set forth in claim 1 wherein said detecting means comprises a second winding on said magnetic head.

3. The system as set forth in claim 2 wherein said second winding is supplied with an electrical current bias.

4. The system as set forth in claim 2 wherein said second winding has an end tap connected to a center tap of said write winding.

5. The system as set forth in claim 3 wherein said second winding is supplied with an electrical current bias sufficient to erase portions of data on said magnetic medium.

6. The systems as set forth in claim 1 wherein said magnetic medium is constantly moving at high speed during writing and detecting operations.

7. A system for simultaneously recording and verifying data being recorded on a magnetic medium comprising:

a megnetic medium, a source of data pulses indicative of information to be recorded on said magnetic medium having at least one pulse for each bit of data to be recorded, a first writing element connected to said source of data pulses for producing writing flux changes in said magnetic medium indicative of each data bit being written on said magnetic medium, detecting means for sensing said writing flux changes at the same time said data bits are being written on said magnetic medium and providing induced voltage pulses simultaneously with said writing flux changes being detected, means for amplifying and shaping said induced voltage pulses and providing derived voltage pulses subsequent to said induced voltage pulses, delay means coupled to said source of data pulses for providing delayed data pulses, and comparison means adapted to receive said delayed data pulses and said derived voltage pulses for producing error signals when said writing flux changes in said magnetic medium do not coincide in time and polarity with said induced voltage pulses whereby writing and verifying operations occur simultaneously.

* * * * *